(12) United States Patent
Nino et al.

(10) Patent No.: US 7,316,215 B1
(45) Date of Patent: Jan. 8, 2008

(54) VALVE COVER ASSEMBLY FOR A VEHICLE ENGINE AND METHOD FOR PRODUCING SAME

(75) Inventors: Juan C. Nino, Dearborn, MI (US); Marcello Tedesco, Saline, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 11/285,645

(22) Filed: Nov. 21, 2005

(51) Int. Cl.
*F01M 9/10* (2006.01)

(52) U.S. Cl. .............................. 123/90.38; 123/90.37; 123/195 C (58) Field of Classification Search ............ 123/90.38, 123/90.37, 195 C; 29/888.01
See application file for complete search history.

(56) References Cited

U.S. PATENT DOCUMENTS

| 4,709,670 | A | * | 12/1987 | Ampferer ............... 123/195 C |
|---|---|---|---|---|
| 5,375,569 | A | | 12/1994 | Santella |
| 5,513,603 | A | * | 5/1996 | Ang et al. ............... 123/90.37 |
| 5,957,100 | A | * | 9/1999 | Frohwerk et al. ........ 123/90.38 |
| 6,371,073 | B1 | | 4/2002 | Billimack et al. |
| 6,382,158 | B1 | | 5/2002 | Durnen |
| 6,491,014 | B1 | | 12/2002 | Eickert |
| 6,860,010 | B2 | | 3/2005 | Jones et al. |
| 2002/0112684 | A1 | | 8/2002 | Jones et al. |
| 2004/0144349 | A1 | | 7/2004 | Wampula et al. |

* cited by examiner

*Primary Examiner*—Zelalem Eshete
(74) *Attorney, Agent, or Firm*—MacMillan, Sobanski & Todd, LLC (57) ABSTRACT

The present invention relates to a valve cover assembly adapted to be secured to a cylinder head of a vehicle engine. The valve cover assembly includes a valve cover body formed from a first material and an attachment member formed from a second material and attached to the valve cover body.

10 Claims, 6 Drawing Sheets

VALVE COVER ASSEMBLY FOR A VEHICLE ENGINE AND METHOD FOR PRODUCING SAME

BACKGROUND OF THE INVENTION

The present invention relates generally to vehicle engines and in particular to an improved valve cover assembly for use in such a vehicle engine and a method for producing the same.

Vehicle engines typically have their valve train components covered with pans or covers designed to protect the valves and other associated internal components from a variety external contaminants and to contain engine oil and combustion gases within the engine for proper disposal. Such pans or covers are commonly referred to as valve covers, rocker covers, cam covers, oil pans, and the like. Traditionally, these covers have been made from a metal, such as steel, magnesium, or aluminum. Often, the method of manufacturing these covers has been to deep draw a relatively thin metal stamping to produce a cover with flanges. The flanges are then typically bolted to a portion of a machine or engine, such as the cylinder head. A pre-formed gasket or a bead of sealant is typically disposed between the flanges and the cylinder head to provide a fluid-tight seal. Limitations with the methods of drawing traditionally allow for only relatively simple pan or cover shapes and a limited depth of draw. Additional features, such as mounting brackets and other bosses, are usually added with a secondary operation, such as spot welding, that add undesirable additional time and cost. It would therefore be advantageous to provide an improved cover, such as a valve cover, and an improved method of making such a cover.

SUMMARY OF THE INVENTION

The present invention relates to a valve cover assembly adapted to be secured to a cylinder head of a vehicle engine. The valve cover assembly includes a valve cover body formed from a first material and an attachment member formed from a second material and attached to the valve cover body.

Other advantages of this invention will become apparent to those skilled in the art from the following detailed description of the invention, when read in light of the accompanying drawings.

DETAILED DESCRIPTION OF THE INVENTION

Figure 1:
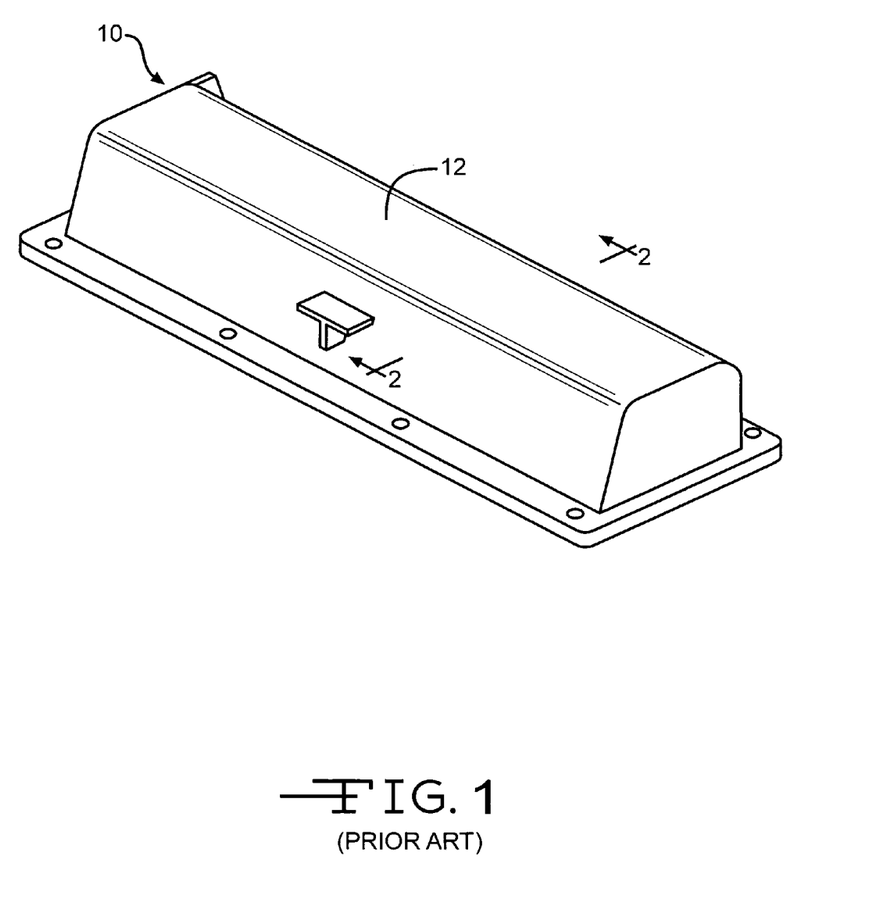
FIG. 1 is a perspective view of a prior art valve cover.
Figure 2:
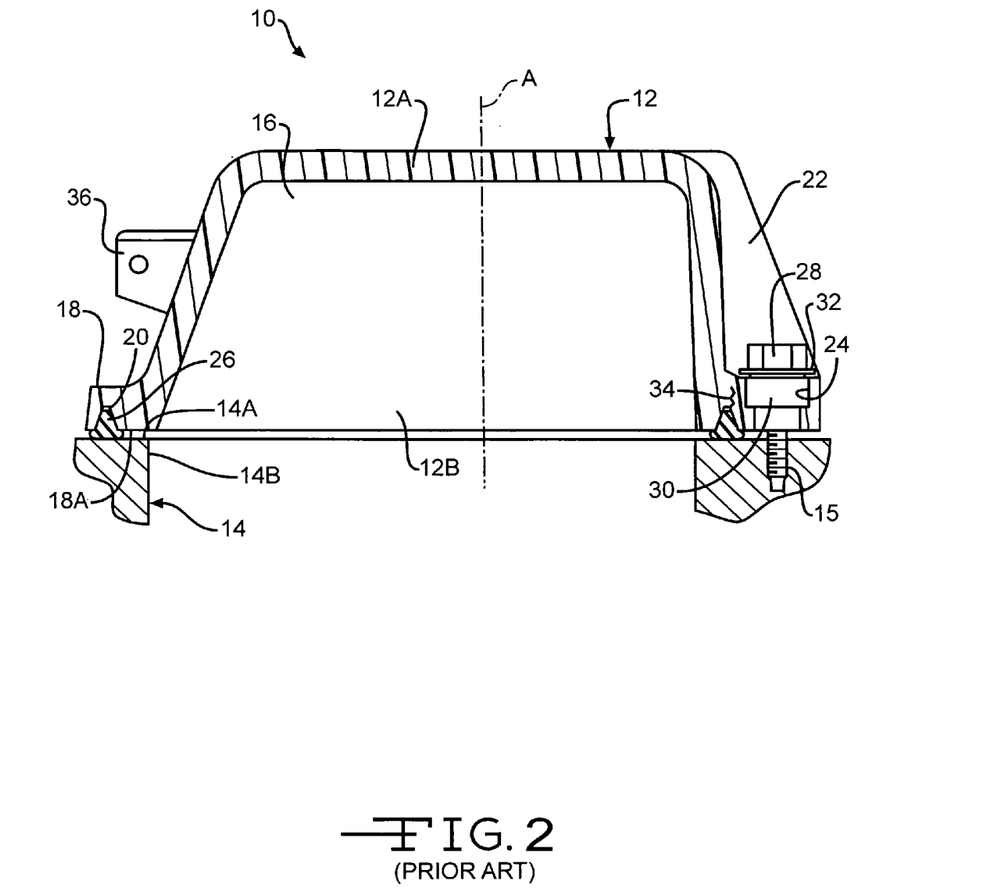
FIG. 2 is an enlarged sectional view taken along line 2-2 of prior art FIG. 1 and showing the valve cover mounted on a cylinder head of a vehicle engine.

Referring now to the drawings, there is illustrated in prior art FIGS. 1 and 2, a valve cover assembly, indicated generally at 10. The prior art valve cover assembly 10 includes a valve cover body 12 mounted to a vehicle engine cylinder head, a portion of which is indicated generally at 14 in prior art FIG. 2. The general structure and operation of the prior art cylinder head 14 and valve cover assembly 10 is conventional in the art. Thus, only those portions of the prior art cylinder head 14 and valve cover assembly 10 which are necessary for a full understanding of this invention will be explained and illustrated in detail.

The prior art valve cover assembly 10 shown is for use with an internal combustion vehicle engine (not shown). The valve cover assembly 10 may be used with other types of engines if so desired. The valve cover assembly 10 is intended for mounting on the cylinder head 14 of an engine block (not shown). In the illustrated embodiment, the cylinder head 14 includes an upper surface 14A, and an inner circumferential surface 14B defining a cylinder head opening. The upper surface 14A may include a plurality of threaded bolt holes 15 provided therein (only one of such bolt holes 15 being shown in prior art FIG. 2). It will be appreciated that any desired number of bolt holes 15 may be provided.

In the illustrated embodiment, the valve cover body 12 defines a chamber 16 and a vertical axis A and has a closed end 12A and an opened end 12B. A valve cover flange 18 extends generally radially outwardly from the valve cover body 12 at the open ended 12B thereof. A lower surface 18A of the valve cover flange 18 may include a circumferentially extending sealing groove 20 formed therein. If desired, one or more strengthening ribs 22 may extend outwardly from an outer surface of the valve cover body 12. One or more fastener holes 24, such as a bolt hole 24, (only one of such bolt holes 24 being shown in prior art FIG. 2), may be formed through the valve cover flange 18. It will be appreciated that any desired number of bolt holes 24 may be provided. The prior art valve cover body 12 is typically made from steel, magnesium, or aluminum.

In the illustrated embodiment, a fluid seal, such as a gasket or an O-ring 26, is disposed in the groove 20 of the valve cover flange 18. The gasket 26 is effective to provide a fluid-tight seal between the valve cover body 12 and the cylinder head 14 to prevent a fluid from leaking therebetween. Suitable fasteners, such as a bolt 28, may extend through the bolt hole 24 and be received in the threaded bolt hole 15 in a known manner for attaching the valve cover body 12 to the cylinder head 14. In the illustrated embodiment, a grommet 30 is disposed within the bolt hole 24, although such a grommet 30 is not required. Additionally, in the illustrated embodiment, a torque limiter 32 is provided about the bolt 28, although such a torque limiter 32 is not required.

It will be appreciated, however, that one or more undesirable leak paths may develop in the illustrated prior art valve cover assembly 10. For example, uneven distribution of the clamping force between the valve cover body 12 and the cylinder head 14 may cause undesirable gaps or leak paths to develop. Additionally, undesirable stress, such as known as flange crush, may cause cracks 34 (only one of such cracks 34 being shown in prior art FIG. 2), to form at or near the sealing groove 20. Such cracks 34 may result in producing undesirable leak paths.

In the illustrated embodiment, a boss or bracket 36 extends generally outwardly from the outer surface of the valve cover body 12. Such a bracket 36 may be provided to support, mount, or attach objects, such as, for example, a fuel rail or wiring (not shown). The bracket 36 may be formed from any desired material, such as aluminum or alloys thereof. Alternately, the bracket 36 may be formed from any other desired metals or non-metals. The bracket 36 may be attached to the valve cover body 12 by any suitable means, such as, for example, spot welding or with an adhesive.

Figure 3:
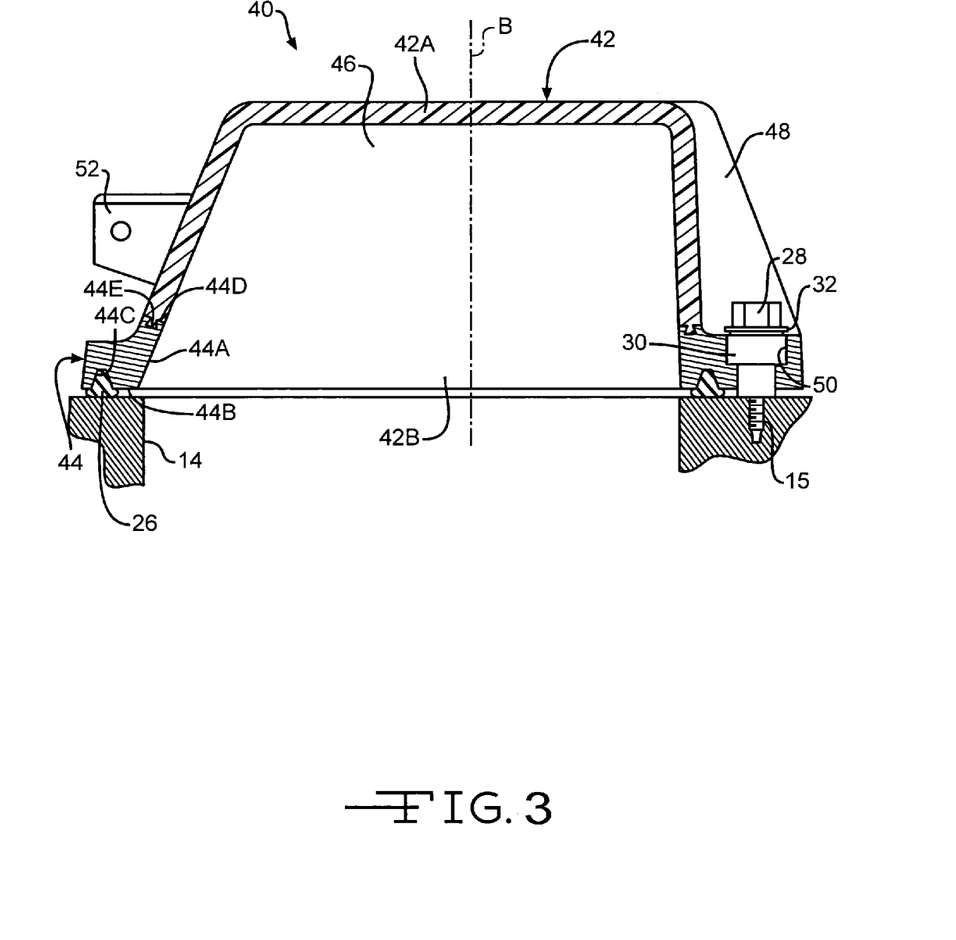
FIG. 3 is an enlarged sectional view of a first embodiment of a valve cover assembly constructed in accordance with the present invention, showing the valve cover assembly mounted on a cylinder head of a vehicle engine.

Referring now to FIG. 3 and using like reference numbers to indicate corresponding parts, there is illustrated a first embodiment of a valve cover assembly, indicated generally at 40, in accordance with the present invention. The illustrated valve cover assembly 40 is preferably adapted for use on an internal combustion vehicle engine (only a portion of which is illustrated). The valve cover assembly 40 may, however, be used with other types of engines if so desired. In the illustrated embodiment, the valve cover assembly 40 is intended for mounting on the cylinder head 14 of an engine block (not shown).

The valve cover assembly 40 includes a valve cover body 42 and an attachment member or hold down flange 44. The valve cover body 42 defines a chamber 46 and a vertical axis B and has a closed end 42A, an opened end 42B. One or more strengthening ribs 48 may extend generally outwardly from an outer surface of the valve cover body 42. One or more fastener or bolt holes 50 (only one of such bolt holes 50 being shown in FIG. 3), may be formed through the base flange 44. It will be appreciated that any desired number of bolt holes 50 may be provided.

In the illustrated embodiment, the base flange 44 is generally polygonal in shape and includes an inner circumferential surface 44A defining a base flange opening. The base flange 44 further includes a lower surface 44B having a circumferentially extending first groove 44C formed therein, and an upper surface 44D having circumferentially extending second groove 44E formed therein. In the illustrated embodiment, the second groove 44E has a generally trapezoidal cross-sectional shape and defines a portion of a dovetail type joint, as will be described in detail below.

In the illustrated embodiment, the base flange 44 is made of a relatively rigid material, such as for example cast aluminum or an alloy thereof. Alternatively, the base flange 44 can be formed from other suitable materials, such as for example, other metals, metal alloys, and non-metals.

In the illustrated embodiment, a fluid seal, such as the gasket 26 is disposed in the groove 44C of the base flange 44. The gasket 26 may be effective to provide a fluid-tight seal between the base flange 44 and the cylinder head 14, to prevent fluid from leaking therebetween. Suitable fasteners, such as the bolts 28, may extend through the bolt holes 50 and be received in the threaded bolt holes 15 in a known manner for attaching the base flange 44 to the cylinder head 14. In the illustrated embodiment, the grommet 30 is disposed within the bolt hole 50, although such a grommet 30 is not required. Additionally, in the illustrated embodiment, the torque limiter 32 is provided about the bolt 28, although such a torque limiter 32 is not required.

In the illustrated embodiment, a boss or bracket 52 extends generally outwardly from the outer surface of the valve cover body 42. Such a bracket 52 may be integrally formed with the valve cover body 42 to support, mount, or attach objects, such as, for example, a fuel rail or wiring. Alternately, the bracket 52 may be separately formed and attached to the valve cover body 42 by any suitable means, such as, for example, sonic welding or with an adhesive.

In the illustrated embodiment, the valve cover body 42 is made from a suitable plastic or polymer material capable of being formed by a molding process. In one embodiment, the valve cover body 42 is made of nylon, such as nylon 66 with a 30 percent glass content. It will be appreciated, however, that the valve cover body 42 can be formed from any other suitable plastics, polymers, and non-metals.

In the illustrated embodiment, the valve cover body 42 is secured to base flange 44 in the area of the upper surface 44D thereof. The valve cover body 42 can be secured to the base flange 44 by any desired method. For example, the valve cover body 42 may be permanently secured to the base flange 44 by mechanically joining the two components together during an in situ molding process to thereby form an "overmolded" valve cover assembly 40. As used herein, the term overmolded defines an assembly wherein the valve cover body 42 is permanently connected or joined to the base flange 44 during the molding process to form an integrally joined assembly.

In such a molding process, the base flange 44 may be placed within a portion of a mold cavity (not shown) of a mold (not shown). Valve cover body material, such as a polymer melt, is then introduced into the mold cavity such that the polymer melt is in contact with the base flange 44. It will be appreciated that the entire base flange 44 can be placed into the mold, or only the portion of the base flange 44 to be bonded, such as that portion including at least the upper surface 44D and the second groove 44E, can be placed into the mold. It will be further appreciated that the valve cover body 42 can be bonded to the base flange 44 by any other desired method, such as with an adhesive.

Alternatively, the polymer material of the valve cover body 42 may become joined to the base flange 44 during the molding process for forming the valve cover assembly 40. For example, features, such as the dovetail-shaped (as viewed in FIG. 3) second groove 44E, recesses, bosses, or protrusions (not shown), and combinations of grooves, recesses, and protrusions, can be provided on the base flange 44, such that the molten valve cover body material fills the second groove 44E during the molding process. The valve cover body material thereby becomes mechanically locked or joined to the base flange 44 when the valve cover body material hardens within the second groove 44E. It will be appreciated that the second groove 44E, recesses, and/or protrusions can be of any desired shapes, such as ring-shaped, cylindrically shaped, or shaped to define a dovetail type joint or its equivalent as shown in FIG. 3.

Alternatively, the valve cover body 42 can be permanently secured to the base flange 44 by mechanically joining the two components together during an in situ casting process, wherein, for example, the base flange 44 is cast about a portion of the valve cover body 42 to secure the base flange 44 to the valve cover body 42.

Figure 4:
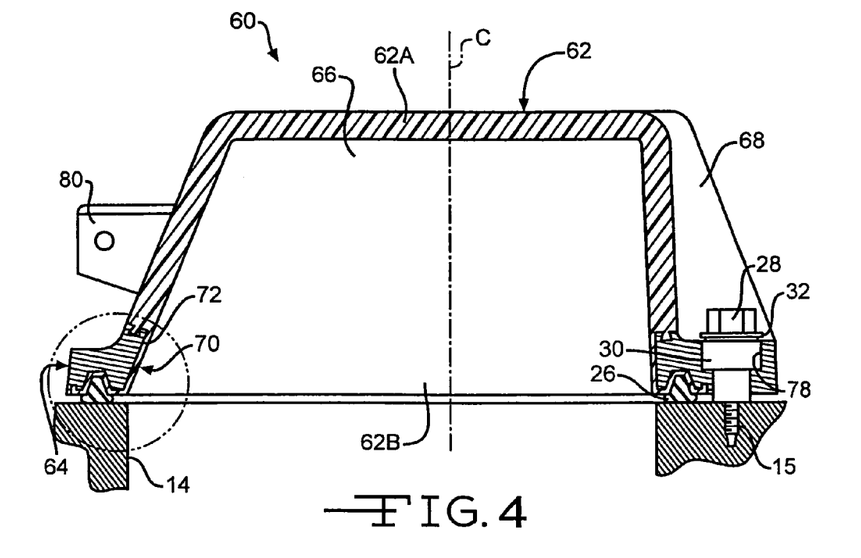
FIG. 4 is a sectional view of a second embodiment of a valve cover assembly constructed in accordance with the present invention, showing the valve cover assembly mounted on a cylinder head of a vehicle engine.
Figure 4A:
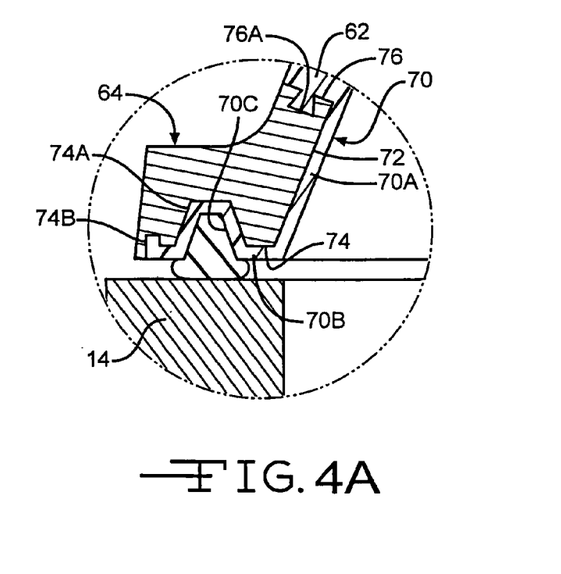
FIG. 4A is a sectional view of a portion of the second embodiment illustrated in FIG. 4.

Referring now to FIGS. 4 and 4A and using like reference numbers to indicate corresponding parts, there is illustrated a second embodiment of a valve cover assembly, indicated generally at 60, in accordance with the present invention. The illustrated valve cover assembly 60 is preferably for use on an internal combustion vehicle engine (only a portion of which is illustrated). The valve cover assembly 60 may, however, be used with other types of engines if so desired.

In the illustrated embodiment, the valve cover assembly 60 is intended for mounting on the cylinder head 14 of an engine block (not shown).

The valve cover assembly 60 includes a valve cover body 62 and an attachment member or hold down flange 64. The valve cover body 62 defines a chamber 66 and a vertical axis C and has a closed end 62A and an opened end 62B. One or more strengthening ribs 68 may extend generally outwardly from an outer surface of the body 62. A sealing flange 70 extends generally axially outwardly from the body 62 at the opened end 62B (downwardly as viewed in FIG. 4). The sealing flange 70 includes a generally axially extending portion 70A and a generally radially outwardly extending portion 70B. The radially outwardly extending portion 70B includes a groove 70C provided therein.

In the illustrated embodiment, the base flange 64 is generally polygonal in shape and includes an inner circumferential surface 72 defining a base flange opening. The base flange 64 further includes a lower surface 74 having a circumferentially extending first groove 74A and a recess 74B formed therein, and an upper surface 76 having circumferentially extending second groove 76A formed therein. In the illustrated embodiment, the second groove 76A has a generally trapezoidal cross-sectional shape, and defines a portion of a dovetail type joint, as described in detail above. In the illustrated embodiment, the groove 70C of the sealing flange 70 is disposed within the first groove 74A of the base flange 64. One or more fastener holes 78 (only one of such holes 78 being shown in FIG. 4), may be formed through the base flange 64. It will be appreciated that any desired number of holes 78 may be provided.

In one embodiment, the base flange 64 is made of a relatively rigid material, such as for example cast aluminum or an alloy thereof. Alternately, the base flange 64 can be formed from other suitable materials, such as, for example, other metals, metal alloys, and non-metals.

In the illustrated embodiment, a fluid seal, such as the gasket 26 is disposed in the sealing groove 70C of the sealing flange 70. The gasket 26 may be effective to provide a fluid-tight seal between the sealing flange 70 and the cylinder head 14, to prevent fluid from leaking therebetween. Suitable fasteners, such as the bolt 28, may extend through the hole 78 and be received in the threaded bolt hole 15 in a known manner for attaching the base flange 64 to the cylinder head 14. In the illustrated embodiment, a grommet 30 is disposed within the hole 78, although such a grommet 30 is not required. Additionally, in the illustrated embodiment, a torque limiter 32 is provided about the bolt 28, although such a torque limiter 32 is not required.

In the illustrated embodiment, a boss or bracket 80 extends outwardly from the outer surface of the valve cover body 62. Such a bracket 80 may be integrally formed with the valve cover body 62 to support, mount, or attach objects, such as, for example, a fuel rail or wiring. Alternately, the bracket 80 may be separately formed and attached to the valve cover body 62 by any suitable means, such as, for example, sonic welding or with an adhesive.

In the illustrated embodiment, the valve cover body 62 is made from a suitable plastic or polymer material capable of being formed by a molding process. In one embodiment, the valve cover body 62 is made of nylon, such as nylon 66 with a 30 percent glass content. It will be appreciated, however, that the valve cover body 62 can be formed from any other suitable plastics, polymers, and non-metals.

In the illustrated embodiment, the valve cover body 62 is secured to the base flange 64. The valve cover body 62 can be secured to the base flange 64 by any desired method. For example, the valve cover body 62 may be permanently secured to the base flange 64 by mechanically joining the two components together during an in situ molding process to thereby form an overmolded valve cover assembly 60.

In such a molding process, the base flange 64 may be placed within a portion of a mold cavity of a mold (not shown). Valve cover body material, such as a polymer melt, is then introduced into the mold cavity such that the polymer melt is in contact with the base flange 64. It will be appreciated that the entire base flange 64 can be placed into the mold, or only the portion of the base flange 44 to be bonded, such as the lower surface 74, the first groove 74A, the inner surface 72, the upper surface 76, and the second groove 76A, can be placed into the mold. It will be further appreciated that the valve cover body 62 can be bonded to the base flange 64 by any other desired method, such as with an adhesive.

Alternately, the polymer of the valve cover body 62 may become joined to the base flange 64 during the molding process to form the valve cover assembly 60. For example, features, such as the first groove 74A, the dovetail-shaped (as viewed in FIG. 4) second groove 76A, the recess 74B, other bosses or protrusions (not shown), and combinations of grooves, recesses, and protrusions, can be provided on the base flange 64, such that the molten valve cover body material fills the second groove 76A during the molding process. The valve cover body material thereby becomes mechanically locked or joined to the base flange 64 when the valve cover body material hardens within the first and second grooves 74A and 76A. It will be appreciated that the second groove 76A, recesses, and/or protrusions can be of any desired shapes, such as ring-shaped, cylindrically shaped, or shaped to define a dovetail type joint as shown in FIG. 4.

Alternately, the valve cover body 62 can be permanently secured to the base flange 64 by mechanically joining the two components together during an in situ casting process, wherein, for example, the base flange 64 is cast about a portion of the valve cover body 62 to secure the base flange 64 to the valve cover body 62.

Figure 5:
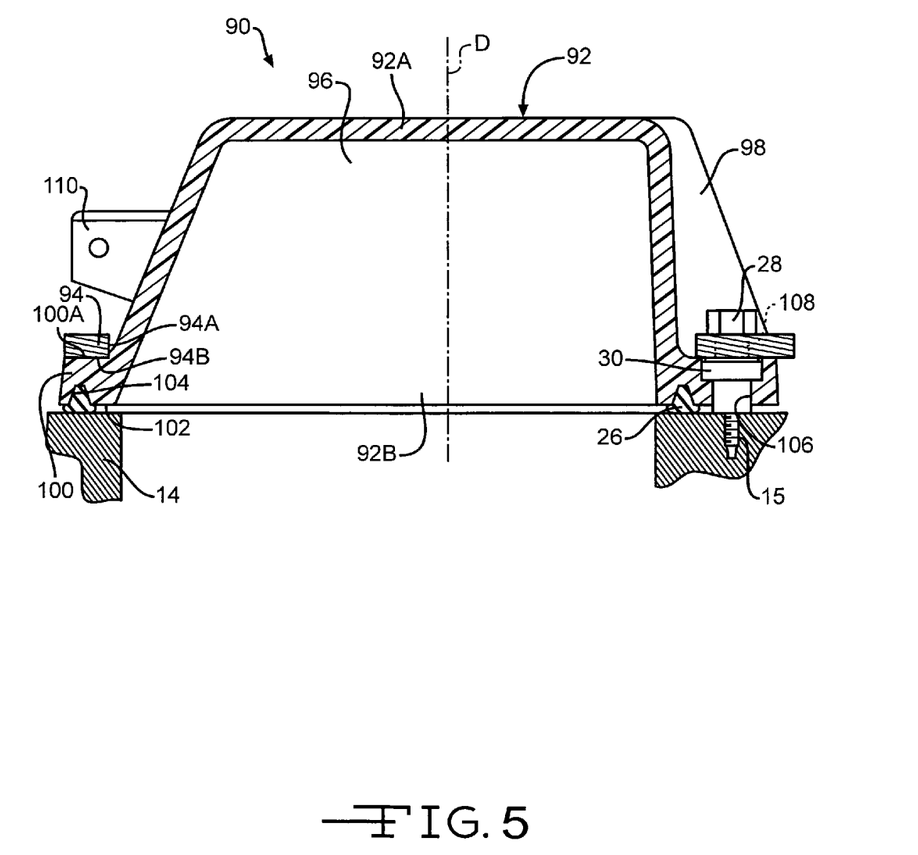
FIG. 5 is a sectional view of a third embodiment of a valve cover assembly constructed in accordance with the present invention, showing the valve cover assembly mounted on a cylinder head of a vehicle engine.

Referring now to FIG. 5 and using like reference numbers to indicate corresponding parts, there is illustrated a third embodiment of a valve cover assembly, indicated generally at 90, in accordance with the present invention. The illustrated valve cover assembly 90 is for use on an internal combustion vehicle engine (only a portion of which is illustrated). The valve cover assembly 90 may, however, be used with other types of engines if so desired. In the illustrated embodiment, the valve cover assembly 90 is intended for mounting on the cylinder head 14 of an engine block (not shown).

The valve cover assembly 90 includes a valve cover body 92 and an attachment member or hold down flange 94. The valve cover body 92 defines a chamber 96 and a vertical axis C and has a closed end 92A and an open ended 92B. One or more strengthening ribs 98 may extend outwardly from an outer surface of the body 92. A valve cover flange 100 extends radially outwardly from the body 92 at the opened end 92B of the valve cover body 92. A lower surface 102 of the valve cover flange 100 may include a circumferentially extending sealing groove 104 formed therein. One or more fastener holes 106 (only one of such holes 106 being shown in FIG. 5), may be formed through the valve cover flange 100. It will be appreciated that any desired number of holes 106 may be provided.

In the illustrated embodiment, the flange 94 is generally polygonal in shape and includes an inner circumferential surface 94A. The hold down flange 94 further includes a lower surface 94B. In the illustrated embodiment, the hold down flange 94 is disposed about the valve cover body 92 such that the lower surface 94B of the hold down flange 94 engages an upwardly facing (as viewed in FIG. 5) surface 100A of the valve cover flange 100. One or more fastener holes, such as a bolt hole 108 may be formed through the hold down flange 94. It will be appreciated that any desired number of bolt holes 108 may be provided.

In one embodiment, the hold down flange 94 is made of a relatively rigid material, such as cast aluminum or an alloy thereof. Alternatively, the hold down flange 94 can be formed from other materials, such as, for example, other metals, metal alloys, and non-metals.

In the illustrated embodiment, a fluid seal, such as the gasket 26 is disposed in the sealing groove 104 of the flange 100. The gasket 26 may be effective to provide a fluid-tight seal between the sealing flange 70 and the cylinder head 14, to prevent fluid from leaking therebetween. Suitable fasteners, such as the bolt 28, may extend through the bolt holes 106 and 108 and be received in the threaded bolt hole 15 in a known manner for attaching the hold down flange 94 and the valve cover flange 100 to the cylinder head 14. In the illustrated embodiment, a grommet 30 is disposed within the bolt hole 106, although such a grommet 30 is not required. Additionally, in the illustrated embodiment, a torque limiter (not shown), may be provided about the bolt 28, although such a torque limiter is not required.

In the illustrated embodiment, a boss or bracket 110 extends outwardly from the outer surface of the valve cover body 92. Such a bracket 110 may be integrally formed with the valve cover body 92 to support, mount, or attach objects, such as, for example, a fuel rail or wiring. Alternatively, the bracket 110 may be separately formed and attached to the valve cover body 92 by any suitable means, such as, for example, sonic welding or with an adhesive.

In the illustrated embodiment, the valve cover body 92 is made from a plastic or polymer material capable of being formed by a molding process. In one embodiment, the valve cover body 92 is made of nylon, such as nylon 66 with a 30 percent glass content. It will be appreciated, however, that the valve cover body 92 can be formed from any other plastic, polymers, non-metals, and metals.

Figure 6:
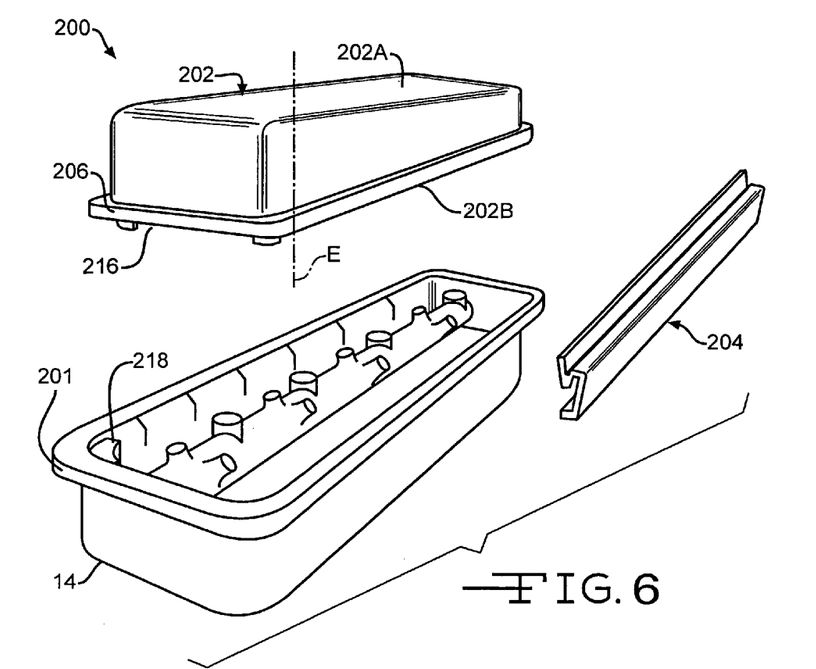
FIG. 6 is an exploded perspective view of a fourth embodiment of a valve cover assembly constructed in accordance with the present invention.
Figure 7:
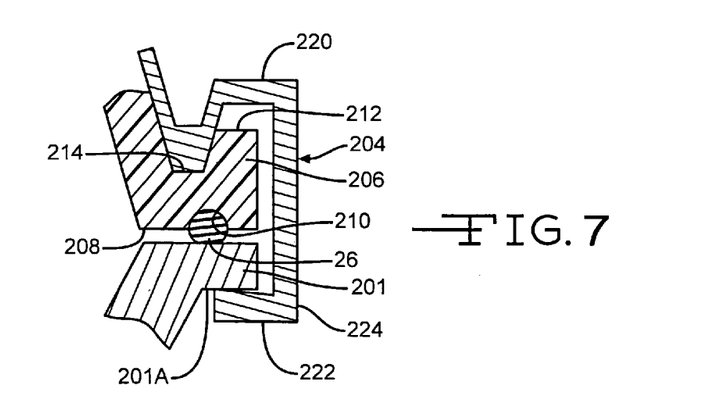
FIG. 7 is a sectional view of a portion of the fourth embodiment illustrated in FIG. 6.

Referring now to FIGS. 6 and 7 and using like reference numbers to indicate corresponding parts, there is illustrated a fourth embodiment of a valve cover assembly, indicated generally at 200, in accordance with the present invention. The illustrated valve cover assembly 200 is for use on an internal combustion vehicle engine (only a portion of which is illustrated). The valve cover assembly 200 may, however, be used with other types of engines if so desired. In the illustrated embodiment, the valve cover assembly 200 is intended for mounting on the cylinder head 14 of an engine block (not shown). In the illustrated embodiment, a cylinder head flange 201 extends radially outwardly from the cylinder head 14 at the open end thereof. The flange 201 includes a lower surface 201A.

The valve cover assembly 200 includes a valve cover body 202 and an attachment member or hold down clip 204. The valve cover body 202 defines a chamber and a vertical axis E and has a closed end 202A and an opened end 202B. One or more strengthening ribs (not shown) may extend outwardly from an outer surface of the body 202. A valve cover flange 206 extends radially outwardly from the body 202 at the open end 202A of the body 202. A lower surface 208 of the valve cover flange 206 may include a circumferentially extending sealing groove 210 formed therein. An upper surface 212 of the flange 206 may include a circumferentially extending mounting groove 214 formed therein.

One or more locating tabs 216, for positioning the valve cover body 202 relative to the cylinder head 14, may be provided on the lower surface 208 of the valve cover flange 206. In the illustrated embodiment, four locating tabs 216 are provided which extend generally axially outwardly of the flange 206 at the corners of the valve cover body 202. It will be understood however, that any desired number of tabs 216 may be provided. It will be further understood that no tabs are required. Tab receiving recesses 218 (only one of such recesses 218 being shown in FIG. 6), for receiving and seating the tabs 216, may be formed in an inner wall surface of the cylinder head 14.

As shown in FIG. 7, the clip 204 includes a first radially inwardly extending portion 220, a second radially inwardly extending portion 222, and an axially extending portion 224 therebetween. As best shown in FIG. 7, the first radially inwardly extending portion 220 is substantially V-shaped in cross-section and is structured and configured to be seated in the mounting groove 214 of the valve cover body 202. The second radially inwardly extending portion 222 engages the lower surface 201A of the cylinder head flange 201.

Although only one clip 204 is shown in the illustrated embodiment of the valve cover assembly 200, the valve cover body 202 may attached to the cylinder head 14 by four clips 204, preferably one on each of the four sides of the valve cover assembly 200. Such an arrangement of clips 204 about the valve cover assembly 200 provides a substantially even or uniform distribution of clamping force along the length of each clip 204 and between the valve cover body 202 and the cylinder head 14. It will be understood however, that the clip 204 may have any desired length, and that any desired number of clips 204 may be used to attach the valve cover body 202 to the cylinder head 14. For example, more than one clip 204 may be used on one or more of the sides of the valve cover assembly 200.

Alternately, one clip 204 having a circumferential shape corresponding to the shape of the flanges 201 and 206 may be used to attach the valve cover body 202 to the cylinder head 14.

In one embodiment, the clip 204 is made of a relatively rigid material having strength and flexibility, such as spring steel. Alternately, the clip 204 can be formed from other materials, such as, for example, other metals, metal alloys, and non-metals that provide strength flexibility, and a substantially even or uniform distribution of clamping force along the length of each clip 204 and between the valve cover body 202 and the cylinder head 14.

In the illustrated embodiment, a fluid seal, such as the gasket 26 is disposed in the sealing groove 210 of the flange 206. The gasket 26 may be effective to provide a fluid-tight seal between the valve cover flange 206 and the cylinder head flange 201, to prevent fluid from leaking therebetween.

Although not shown in the illustrated embodiment, a boss or bracket may extend outwardly from the outer surface of the valve cover body 202. Such a bracket may be integrally formed with the valve cover body 202 to support, mount, or attach objects, such as, for example, a fuel rail or wiring. Alternately, such a bracket may be separately formed and attached to the valve cover body 202 by any suitable means, such as, for example, sonic welding or with an adhesive.

In the illustrated embodiment, the valve cover body 202 is made from a suitable plastic or polymer material capable of being formed by a molding process. In one embodiment, the valve cover body 92 is made of nylon, such as nylon 66 with a 30 percent glass content. It will be appreciated, however, that the valve cover body 92 can be formed from any other suitable plastics, polymers, non-metals, and metals.

The principle and mode of operation of this invention have been described in its various embodiments. However, it should be noted that this invention may be practiced otherwise than as specifically illustrated and described without departing from its scope.

What is claimed is:

1. A valve cover assembly adapted to be secured to a cylinder head of a vehicle engine, said valve cover assembly comprising:
   a valve cover body having a closed end and an open end and formed from a first material;
   an attachment member extending circumferentially uninterrupted about said open end of said valve cover body, said attachment member formed from a second material and attached to said valve cover body about said open end, wherein the attachment member being a continuation of said valve cover body; and
   a seal disposed between said attachment member and said cylinder head;
   wherein said attachment member is provided with a groove formed therein adapted to receive said seal therein for forming a seal between said valve cover assembly and the cylinder head of the vehicle engine.

2. The valve cover assembly of claim 1 wherein said valve cover body is permanently attached to said attachment member.

3. The valve cover assembly of claim 1 wherein said valve cover body is releasably attached to said attachment member.

4. The valve cover assembly of claim 1 wherein said valve cover body is formed from a non-metal material and said attachment member is formed from a metal material.

5. The valve cover assembly of claim 1 wherein said valve cover body is formed from a plastic or polymer material and said attachment member is formed from aluminum or steel material.

6. The valve cover assembly of claim 4 wherein said valve cover body is secured to said attachment member by an in situ molding process.

7. The valve cover assembly of claim 1 wherein said attachment member includes at least one clip for each side of said valve cover body.

8. The valve cover assembly of claim 1 wherein said valve cover body includes a flange and said attachment member includes at least a portion which engages an upwardly facing surface of said flange of said valve cover body.

9. The valve cover assembly of claim 1 wherein said attachment member is provided with a plurality of fastener receiving holes.

10. The valve cover assembly of claim 1 wherein said attachment member and said valve cover body are provided with a plurality of fastener receiving holes.

* * * * *